A. WEISBERG.
AUTOMOBILE SIGNAL.
APPLICATION FILED OCT. 28, 1919.

1,371,283.

Patented Mar. 15, 1921.

INVENTOR.
Aaron Weisberg
BY
ATTORNEY.

UNITED STATES PATENT OFFICE.

AARON WEISBERG, OF PUEBLO, COLORADO, ASSIGNOR, BY DIRECT AND MESNE ASSIGNMENTS, OF ONE-SIXTH TO NATHAN BERKOVITZ, AND ONE-SIXTH TO JACOB HELLER, BOTH OF PUEBLO, COLORADO.

AUTOMOBILE-SIGNAL.

1,371,283.  Specification of Letters Patent.  Patented Mar. 15, 1921.

Application filed October 28, 1919. Serial No. 333,890.

*To all whom it may concern:*

Be it known that I, AARON WEISBERG, a citizen of the United States, and a resident of the city and county of Pueblo and State of Colorado, have invented certain new and useful Improvements in Automobile-Signals, of which the following is a full, clear, and exact description, such as will enable others skilled in the art to which the invention appertains to make and use the same.

My invention relates to improvements in traffic signals, and the invention has for its object the provision of a manually operable semaphore adaptable for operation in a convenient manner by the driver of the vehicle.

Another object of the invention resides in the provision of a signal for use on vehicles adapted to be actuated at the will of the driver for the purpose of indicating a contemplated turn, whereby traffic may be warned of any contemplated turn or diversion from a straight-ahead course.

Another object of the invention is to provide a signal for use on vehicles adapted to be illuminated for use at night, or at times when a non-illuminated signal member would not be distinguishable.

With these and other objects in view, the invention will be described in detail with reference to the accompanying drawing.

Figure 1:
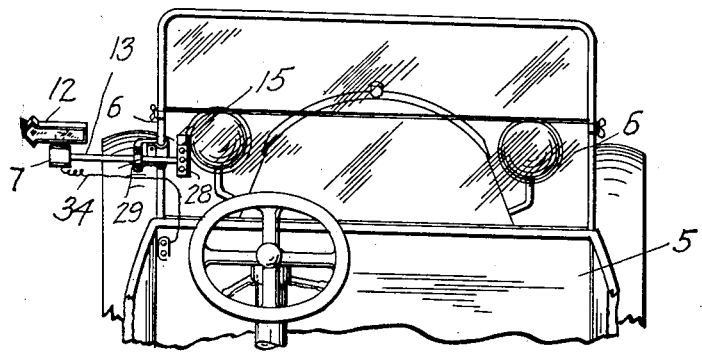
Figure 2:
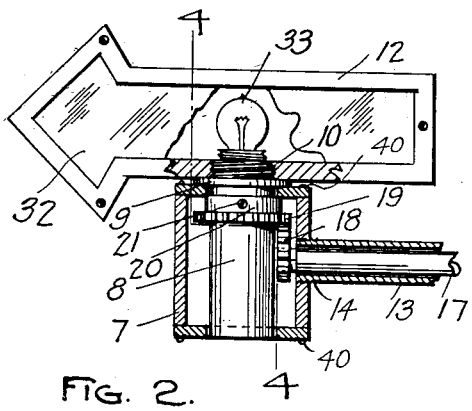
Figure 3:
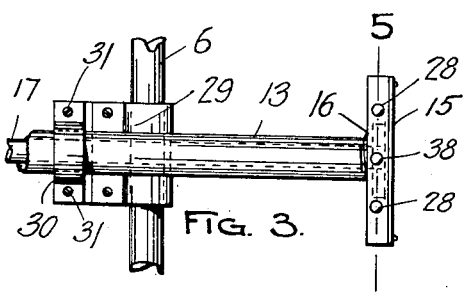
Figure 5:
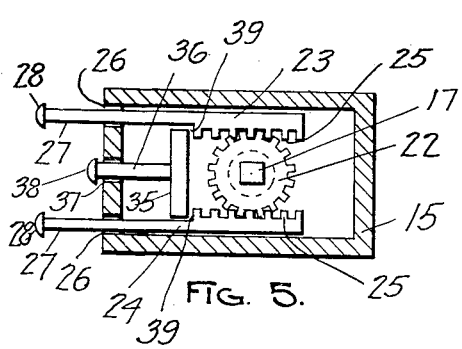
Figure 4:
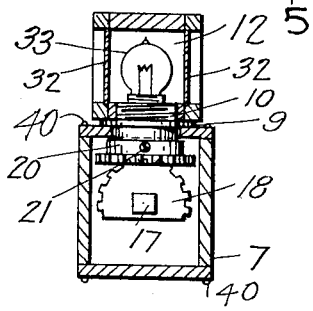

In this drawing Figure 1 is a fragmentary view of an automobile showing my improved signal applied thereto; Fig. 2 is a sectional view illustrating the gearing connection for causing the semaphore to turn; Fig. 3 is a view illustrating the manner of supporting the signal upon the vehicle; Fig. 4 is a cross-sectional view taken on the line 4—4 of Fig. 2; and Fig. 5 is a cross-sectional view taken on the line 5—5 of Fig. 3.

Corresponding and like parts are referred to in the following description and indicated in all the views of the accompanying drawing by the same reference characters.

Let the numeral 5 represent the front end of an automobile, and the numeral 6 the posts of the windshield.

7 represents a housing in which a driven shaft 8 is journaled, the said driven shaft 8 occupying a vertical position in said housing 7. The upper extremity of the driven shaft 8 is provided with a flange 9 thereon which engages with the top of the housing 7. The driven shaft 8 extends through openings in the top and bottom of the housing 7, and its bearing surface is within these openings. The flange 9 prevents the driven shaft 8 from dropping out of said openings. The upper extremity of the driven shaft 8, above the flange 9, is provided with threads 10, which thread into the bottom of a semaphore 12, thereby supporting the said semaphore 12 rigidly upon the driven shaft 8.

A hollow shaft 13 is threaded at one extremity into one side of the housing 7, as shown at 14, and the other extremity of said hollow shaft 13 is threaded into a housing 15, as shown at 16. A driving shaft 17 extends through the hollow shaft 13, and upon one end thereof, within the housing 7, a segmental gear 18 is mounted. This segmental gear 18 meshes with a gear 19, which is mounted upon and secured to the driven shaft 8. The gear 19 is provided with a collar 20, through which a fit screw 21 is passed for holding the gear 19 fixed upon the driven shaft 8. This collar 20 engages with the top of the housing 7 on the interior of the latter, and acts in conjunction with the flange 9 to prevent longitudinal displacement of the driven shaft 8. The teeth upon both the segmental gear 18 and the gear 19 are what is commonly known as spur teeth and the teeth of these two gears intermesh within the housing 7, whereby actuation of the driving shaft 17 will cause the driven shaft 8 to turn. A gear 22 is mounted upon the driving shaft 17 within the housing 15. The teeth of this gear 22 are also of the spur type. Rack bars 23 and 24 are slidably mounted in the housing 15 on opposite sides of the gear 22, said rack bars 23 and 24 being provided on their inner portions with spur teeth 25, which intermesh with the spur teeth of the gear 22. The front end of the housing 15 is provided with openings 26, through which stems 27 of the rack bars 23 and 24 protrude, the ends of these stems 27 being provided with buttons 28 by means of which the rack bars 23 and 24 are manually actuated. By actuating the rack bars 23 and 24 to cause the same to slide, the semaphore 12 is caused to turn in the desired direction, as may be later more fully explained. A clamp 29, which is of ordinary construction, is adapted to be secured to one of the posts 6 of the windshield, as illustrated in Figs. 1 and 3. A strap 30 passes over the hollow shaft 13 and is secured at its extremities to the clamp 29, as shown at 31, whereby the entire signal mechanism is supported by said clamp 29, which in turn is stationarily fixed to the post 6 of the windshield. The signal is in this manner secured upon the automobile in a position convenient for operation by the driver of the latter.

The semaphore 12 is of box-like construction and has the appearance of an arrow. The opposite sides of this semaphore 12 are of transparent material 32. An electric light bulb 33 is secured in the upper extremity of the driven shaft 8, and disposed on the interior of the semaphore 12. The driven shaft 8 is hollow, and an electrical conductor 34 extends through the hollow thereof and connects with the electric bulb 33. The other terminal of this conductor 34 may be connected with the battery of the automobile, whereby electricity is supplied for the illumination of the electric light bulb 33.

In describing the operation of the signal, it will be assumed that the same is placed upon the vehicle in the same position as represented in the drawing. When the vehicle is traveling forwardly, the semaphore 12 will point forwardly, from which position, it may be changed whenever it is desired to turn either to the right or left. By actuating the rack bar 23, the semaphore may be caused to point to the right and occupy a position at right angles to the body of the vehicle, and by actuating the rack bar 24, the said semaphore may be turned to the left and occupy a position at right angles to the body of the vehicle. A cross-head 35 is positioned in the housing 15 and a stem 36 is secured thereto intermediate the extremities of said cross-head and protrudes through an opening 37 in the end of the housing 15. The protruding portion of said stem 36 is provided with a button 38. When one of the rack bars 23 or 24 is pushed inwardly, the gear 22 is caused to rotate, and the rotation thereof causes the other rack bar to be moved outwardly. Referring to Fig. 5 of the drawing, the rack bars 23 and 24 are shown in positions occupied by them when the semaphore 12 is pointing forwardly, and also the cross-head 35 is shown in a similar position. Now, assuming that it is desired to cause the semaphore 12 to be turned so that it will point to the right, thereby indicating a contemplated turn of the vehicle to the right. The rack bar 24 will be pushed inwardly to its limit of movement. This movement of the rack bar 24 will cause the gear 22 to rotate, which in turn will cause the driving shaft 17, gears 18 and 19 and driven shaft 8 to rotate, thus it will be understood the semaphore will have been given a full turn to the right. The rotation of the gear 22 will act upon the other rack bar 23, or 24, as the case may be, to cause the same to move outwardly and thereby extending its stem beyond the end of the housing 15 and placing said rack bar in position for actuation to cause the semaphore 12 to another position in an opposite direction. The rack bars 23 and 24 are provided with shoulders 39 at the terminals of the rack teeth 25, which said shoulders are directly opposite each other when the said rack bars are occupying positions when the semaphore 12 is pointing forwardly. When such is the case, the cross-head 35 is at its limit of inward movement. Now, if the semaphore 12 is pointing to the right, the rack bar 23 will have been moved forwardly in the housing 15, and its shoulder 39 will have engaged with the cross-head 35 and caused the latter to move toward the front edge of the housing 15. Now, to move the semaphore 12 to a position where it will again point forwardly, the cross-head 35 will be moved inwardly by pushing upon the button 38, its inward movement, by engagement with the shoulder 39 with either of the rack bars 23 or 24, as the case may be, will cause said rack bar so engaged to move half way inwardly, and thereby impart a quarter of a complete turn to the semaphore 12 through the operation of the said instrumentalities heretofore explained. Now, assuming that it has been the rack bar 23 which has been actuated half-way inwardly, further inward movement of this rack bar independently of the cross-head 35, will cause the semaphore 12 to make another one quarter turn and point to the left, thereby indicating a contemplated turn of the vehicle to the left.

It will be understood that the normal position of the semaphore 12 is pointing forwardly, and as a consequence the normal position of the rack bars 23 and 24 will be as illustrated in Fig. 5. Inward movement of the cross-head 35 is only for the purpose of returning the semaphore 12 to its forwardly pointing position, and for the returning of the rack bars 23 and 24 to their normal position, whereby the latter are positioned for actuation of the semaphore 12 to move either to the right or left, as is desired.

The top, as well as the bottom, of the housing 7 is secured to the sides thereof by means of fastening devices 40, by the removal of which the said top and sides may be taken off. One side plate of the housing 15 is also secured in position by means of fastening devices 41 by the removal of which, the said side plate may be taken off of the housing so that access may be gained to the interior thereof.

The gears 18 and 22 may be slidably removed from the shaft 17 whereby the shaft 17 may be withdrawn from the hollow shaft 13. In fact, the entire construction may be readily and conveniently taken apart for purposes of repair.

While I have described and illustrated herein a specific form of my invention, it is understood that I am not limited thereto, and that the same may be modified and varied, without departing from the spirit of the invention or the scope of the appended claims.

Having thus described my invention, what I claim and desire to secure by Letters Patent is:—

1. In a vehicle signal, the combination with a revoluble post, adapted to actuate a semaphore carried thereby, of means for revolving said post comprising a driving shaft, a gear mounted on said post, a gear mounted on said driving shaft and meshing with the gear on the post, a driving gear mounted on said driving shaft, two rack bars engageable with the opposite sides of said driving gear and respectively movable for actuating said driving gear, and a cross-head adapted to engage said two rack bars one at a time to move the same to a predetermined position of inward movement.

2. In a vehicle signal, the combination with a driven shaft adapted to actuate a semaphore carried thereby, of means for revolving said driven shaft, comprising a driving shaft, directly geared to said driven shaft, a gear mounted upon said driving shaft, two rack bars engageable with the opposite sides of said gear and respectively movable for actuating said gear, and a member engageable with said rack bars and operable to eagage one at a time of said rack bars to move to a predetermined position in the path of its inward movement.

3. A traffic signal, comprising a housing, a driven shaft journaled in said housing, the upper extremity of said driven shaft extending above said housing and adapted to actuate a semaphore, a driving shaft directly geared to said driven shaft, a gear on said driving shaft, two rack bars between which gear is interposed, said rack bars being engaged with said gear, whereby sliding movement of either rack bar will actuate said gear and transmit power through said driving shaft for turning said semaphore, and a cross-head adapted to be operatively engaged with either of said rack bars for causing the same to actuate said gear and transmit power through said driving shaft, whereby said semaphore is returned to its normal position.

4. In a vehicle signal, the combination with a revoluble member adapted to actuate a semaphore, of means for revolving said member, comprising a driving shaft, an operative connection between said driving shaft and said member, a gear mounted upon said driving shaft, two rack bars engageable with the opposite sides of said gear and respectively movable for actuating said gear in opposite directions, and a reciprocable cross head adapted to engage said two rack bars, one at a time, to move said rack bars in opposite directions for returning said bars and said gear to normal position.

5. In a vehicle signal, the combination with a revoluble post adapted to actuate a semaphore, of means for revolving said post comprising a driving shaft, an operative connection between said driving shaft and said post, a gear mounted on said driving shaft, and rack bars engaging with the opposite sides of said gear, and actuable for operating said gear to revolve said shaft and post in opposite directions.

6. In a vehicle signal, the combination with a revoluble member adapted to actuate a semaphore, of means for revolving said member comprising a driving shaft, an operative connection between said driving shaft and said member, a gear mounted on said driving shaft, and rack bars engaging with the opposite sides of said gear, and actuable for operating said gear to revolve said member in opposite directions, and means to engage either bar to return the parts to normal position.

In testimony whereof I hereby affix my signature.

AARON WEISBERG.